W. AAB.
CYLINDER BORING ATTACHMENT FOR LATHES.
APPLICATION FILED OCT. 20, 1917.
1,295,251.
Patented Feb. 25, 1919.
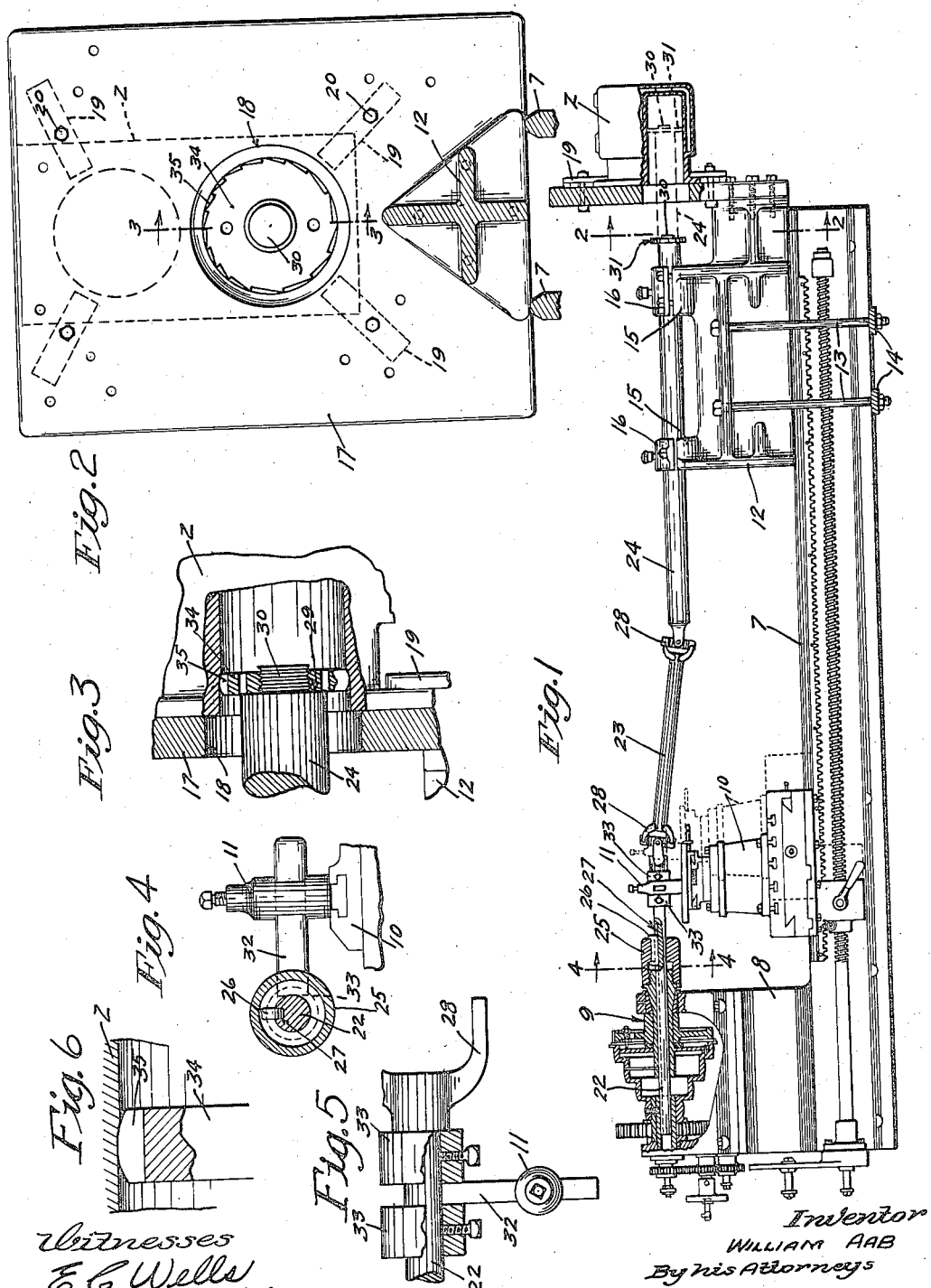
Witnesses
E. C. Wells
H. L. Opsahl.
Inventor
WILLIAM AAB
By his Attorneys

UNITED STATES PATENT OFFICE.

WILLIAM AAB, OF NEW ULM, MINNESOTA.

CYLINDER-BORING ATTACHMENT FOR LATHES.

1,295,251.  Specification of Letters Patent.  Patented Feb. 25, 1919.

Application filed October 20, 1917. Serial No. 197,733.

*To all whom it may concern:*

Be it known that I, WILLIAM AAB, a citizen of the United States, residing at New Ulm, in the county of Brown and State of Minnesota, have invented certain new and useful Improvements in Cylinder-Boring Attachments for Lathes; and I do hereby declare the following to be a full, clear, and exact description of the invention, such as will enable others skilled in the art to which it appertains to make and use the same.

My invention has for its object to provide an extremely simple and highly efficient cylinder boring attachment for lathes; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a view, partly in front elevation and partly in longitudinal central section, showing a standard lathe having the improved attachment applied thereto and adjusted for use in centering a cylinder on the face plate, prior to the boring thereof;

Fig. 2 is a view, partly in elevation and partly in transverse vertical section taken on the line 2—2 of Fig. 1, on an enlarged scale, with the attachment adjusted for use in boring a cylinder;

Fig. 3 is a detail view in central vertical section taken on the line 3—3 of Fig. 2;

Fig. 4 is a detail view, with some parts sectioned on the line 4—4 of Fig. 1, on an enlarged scale;

Fig. 5 is a detail view, principally in plan, of the parts shown in Fig. 4; and

Fig. 6 is a fragmentary detail view, illustrating the shape of the teeth of the boring tool and the cut made thereby in boring a cylinder.

Of the parts of the standard lathe illustrated, it is only necessary, for the purpose of this case, to note the bed 7, head stock 8, spindle 9, carrier 10, and tool post 11.

Referring now in detail to the improved boring attachment, the numeral 12 indicates a cast frame resting on the bed 7, in place of the customary tail stock, and detachably but rigidly secured thereto by long nut-equipped bolts 13 and coöperating tie bars 14. In the top of the frame 12, is a pair of axially alined bearings 15 having adjustable caps 16. To the outer end of the frame 12, is detachably secured a vertical face plate 17 having an annular opening 18 that is in axial alinement with the bearings 15. Clamps 19, for detachably securing an engine casing Z to the outer surface of the face plate 17, with one of its cylinders in axial alinement with the opening 18, are adjustably secured to the face plate 17 by nut-equipped bolts 20 passed through certain of the multiplicity of bores 21 in said face plate.

A three-section shaft or boring bar, the sections of which are indicated by the numerals 22, 23 and 24, has its end section 22 mounted in the spindle 9, with freedom for axial sliding movement. This shaft section 22 is secured to the spindle 9 for rotation therewith, but with freedom for axial sliding movement, by a clutch 25, having a key 26 mounted in a long key-way 27 formed in said shaft section. The ends of the key 26 have lugs or lips which engage opposite shoulders on the clutch 25 and hold the same against endwise movement. Obviously, the shaft section 22 holds the key 26 interlocked with the clutch 25. By removing the shaft section 22 from the spindle 9, the key 26 may readily be detached from the clutch 25.

The intermediate shaft section 23 is connected to the end sections 22 and 24 thereof by universal joints 28. The end shaft section 24 is journaled in the bearings 15, with freedom for axial sliding movement. The outer end of the shaft section 24 is reduced to form a shoulder 29 and a screw-threaded stud 30 for detachably holding a tool thereon.

For centering a cylinder on the face plate 17, I provide a centering head 31, in the form of a washer, having internal screw threads, adapting the same to be screwed onto the stud 30. This centering head 31 is of such size as to snugly fit within one of the cylinders of the engine casing Z and support said casing with the respective cylinder center or, in other words, with the said cylinder in axial alinement with the end shaft section 24. With the engine casing Z supported on the centering head 31, the same may be rigidly secured to the face plate 17 by clamps 21.

Axial movement is imparted to the shaft, for feeding the outer end of its section 24 through the opening 18 in the face plate 17 from one side to the other thereof, by the lathe carrier 10. As one means for connecting the shaft to the lathe carrier 10, I mount in the tool holder 11 a horizontal bar 32, having its outer end held, with respect to the shaft, between a pair of axially spaced collars 33, on the end shaft section 22. In centering a cylinder on the face plate 17, as previously described, the carrier 10 is first operated to move the centering head 31 from its full line position to its dotted line position, as shown in Fig. 1.

After the casing Z has been securely clamped onto the face plate 17, the carrier 10 is reversed to return the centering head 31 to its full line position. The centering head 31 is then removed and a boring tool 34, of novel construction, substituted therefor. The carrier 10 is then set in motion to feed the boring tool 34 into the cylinder and a cut is made thereby, as indicated in Fig. 6. At the completion of this cut, the carrier 10 is reversed to remove the boring tool 34 from the cylinder. During the removal of the boring tool 34 from the cylinder, the same is continuously rotated and a final cut is made to smooth up the first cut.

From the above description, it is evident that by providing the attachment with a jointed shaft, it is not necessary to have the end shaft section 24 axially alined with the lathe spindle 9, thus permitting the frame 12 to be clamped onto the bed 7, without reference to said spindle. With this construction, it is possible to very quickly apply the attachment to a standard lathe, or remove the same therefrom. It is also evident that by utilizing certain of the movable parts of the lathe to drive the shaft and impart axial movement thereto, a very simple and yet efficient cylinder boring attachment is produced.

The boring tool 34, shown in the drawings, is in the form of a flat disk having an axial opening with internal screw threads that adapt the tool to be secured to the stud 30. The periphery of this boring tool 34 is cut to form a plurality of teeth 35 that are axially spaced unequal distances apart to prevent chatter. By reference to Fig. 6, it will be noted that the ends of each tooth 34 are beveled and the intermediate portion thereof is slightly rounded. These beveled ends of the teeth 35 make the first and heavy part of the cut, while the rounded intermediate portions thereof make the finished cut. While only the outer portions of the beveled ends of the teeth 35 do the actual cutting, the inner extremities thereof permit the boring tool to readily enter a cylinder and freely move therein in either direction.

By circumferentially spacing the teeth 35 unequal distances apart, chattering of the tool is entirely overcome, for the reason that each successive tooth strikes the cylinder or work at a different point. In case the teeth 35 were spaced equal distances apart, they would strike the cylinder at given points, thereby making ridges and causing the tool to chatter.

As the teeth 35 circumferentially engage the cylinder, at a multiplicity of points, the tool 34 is firmly held to its work against radial movement. When a single cutting tool is used and engages a hard spot in the cylinder, the same is liable to spring and pass over said hard spot, thereby making the surface of the cylinder uneven. It is, of course, understood that it will be necessary to furnish a plurality of centering heads 31 and boring tools 34 of different sizes to fit cylinders of various different sizes. By the use of the above described cylinder boring attachment, it is possible to bore a cylinder very accurately, and an experienced machinist is not necessary.

What I claim is:—

1. The combination with a lathe, of a cylinder boring attachment comprising a frame for supporting a cylinder, a shaft, a tool carried by the shaft, and connections whereby the shaft may be driven from the lathe spindle and moved axially by the lathe tool carrier for moving the tool into and out of a cylinder secured to the frame.

2. The combination with a lathe, of a cylinder boring attachment comprising a frame for supporting a cylinder, a sectional shaft having a universal joint, a tool carried by the shaft, and connections whereby the shaft may be driven from the lathe spindle and moved axially by the lathe tool carrier for moving the tool into and out of a cylinder secured to the frame, the outer section of the shaft being out of alinement with the lathe spindle.

3. The combination with a lathe, of a cylinder boring attachment comprising a frame for supporting a cylinder, a three-section shaft and universal joints connecting the sections thereof, a tool carried by one of the end sections of the shaft and which end section is journaled on the frame, the other of said end sections being mounted in the lathe spindle for axial sliding movement, a chuck connecting the shaft to the lathe spindle for rotation therewith, and a connection between the lathe tool carrier and shaft, whereby the shaft may be moved axially for feeding the tool into and out of a cylinder secured to the frame, the tool carrying sections of the shaft being out of alinement with the lathe spindle.

4. The combination with a lathe, of a cylinder boring attachment comprising a frame on the lathe bed having a face plate to which a cylinder may be secured, a three-section shaft and universal joints connecting the sections thereof, one of the end sections of the shaft being mounted in the lathe spindle with freedom for axial movement but held for rotation therewith, the other of said end sections being journaled on the frame and carrying a tool, and a connection between the lathe tool carrier and shaft, whereby the shaft may be moved axially to carry the centering head into and out of a cylinder secured to the face plate, the tool carrying section of the shaft being out of alinement with the lathe spindle.

In testimony whereof I affix my signature in presence of two witnesses.

WILLIAM AAB.

Witnesses:
 ALBERT STEINHAUSER,
 M. SCHWENDINGER